(No Model.)
W. A. WHEELER.
WEIGHING SCALE.
No. 528,837.　　　　　　　　　　　Patented Nov. 6, 1894.
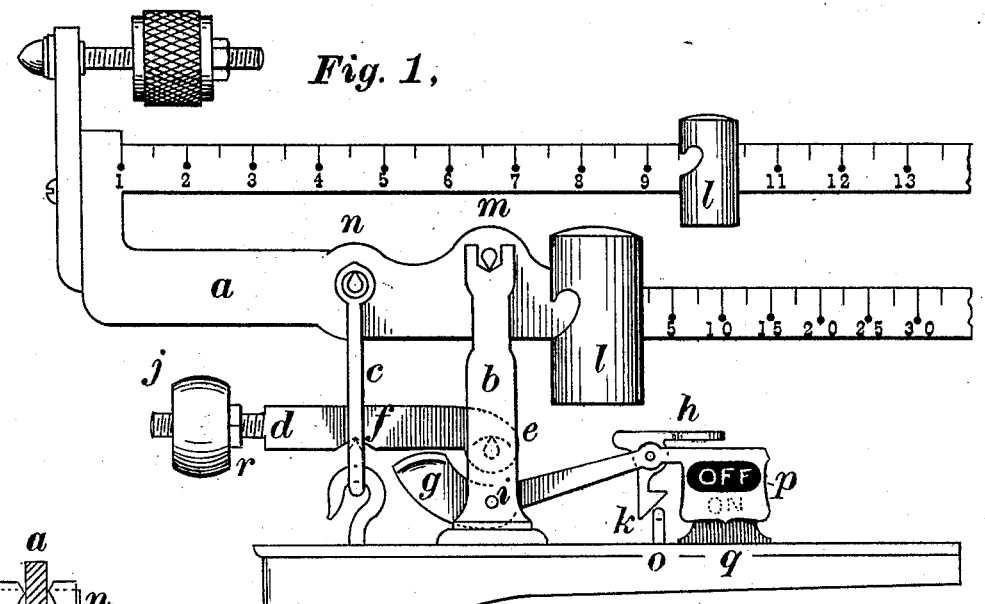
Fig. 1,
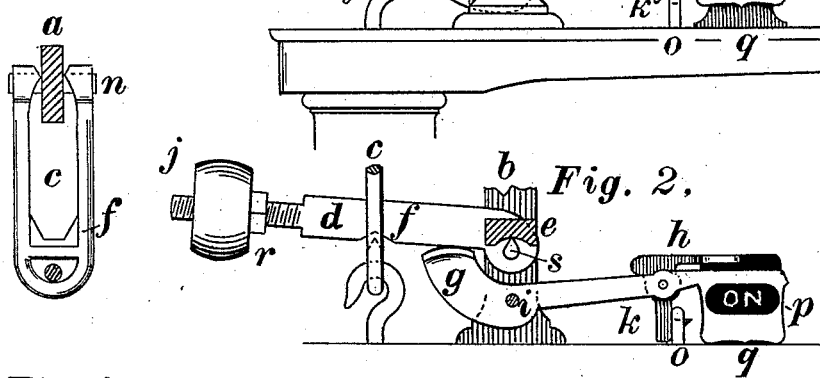
Fig. 2,
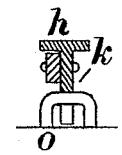
Fig. 3,
Fig. 4,
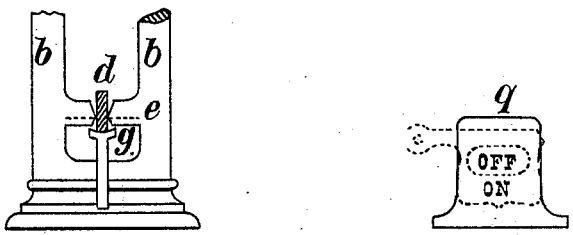
Fig. 5,
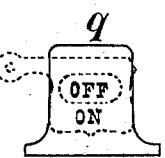
Fig. 6,
Witnesses,　　　　　　　　　　　Inventor,
Edward H. Bazin　　　　　　　William A. Wheeler
James Cox
THE NORRIS PETERS CO., PHOTO-LITHO., WASHINGTON, D. C.

UNITED STATES PATENT OFFICE.

WILLIAM A. WHEELER, OF LITTLETON, NEW HAMPSHIRE, ASSIGNOR TO THE E. & T. FAIRBANKS & COMPANY, OF ST. JOHNSBURY, VERMONT.

WEIGHING-SCALE.

SPECIFICATION forming part of Letters Patent No. 528,837, dated November 6, 1894.

Application filed August 24, 1892. Serial No. 443,948. (No model.)

*To all whom it may concern:*

Be it known that I, WILLIAM A. WHEELER, a citizen of the United States, residing at Littleton, county of Grafton, State of New Hampshire, have invented a new and useful Improvement in Weighing-Scales, of which the following is a full, clear, and exact description.

My invention relates to an improvement in weighing scales and the object is to provide a device for balancing the scoop or pan, whereby the scale may be instantly brought to a balance when the scoop is either on or off the scale, said balance being also adjustable to compensate for any variation in the weight of the scale resulting from use.

A further object is to provide means for automatically indicating the fact whether the parts of the scale are in such position that the scoop should or should not be applied.

The invention therefore consists primarily of a scale provided with a scoop balance comprising a weighted part normally supported by the working mechanism of the scale and adapted to balance the scoop or pan, and a lever pivoted to a stationary part of the scale adapted when depressed at one end to engage with the weighted part, with means for holding said lever in its depressed position, whereby when the scoop is off the scale the weighted part supported by the working mechanism keeps the scale at proper balance while when it is desired to use the scoop the depression of the lever lifts the weighted part from its support on the working mechanism of the scale, and the scoop is placed on the platform or other support thus compensating for the removal of the weighted part.

It consists, secondly, in a movable part adapted to balance the scoop normally supported by the working mechanism of the scoop, positive means for raising the said balance from its support, and a catch for holding it in its raised position.

It consists, thirdly, in the combination with the scoop balancing device and a lever for operating the same, of an indicating mechanism composed of a stationary part and a part movable with the lever adapted to be brought into operation by the movement of said lever.

It consists, finally, in various details of construction and arrangement of parts all as hereinafter described and set forth in the appended claims.

In the accompanying drawings which illustrate the invention, Figure 1 is a side view of a portion of a scale beam showing my invention attached, and the parts in the position they hold when the scoop is removed from the scale platform. Fig. 2 is a similar view with certain of the parts omitted, showing the position when the scoop is in use. Fig. 3 is a cross section showing the latch. Fig. 4 is a cross section showing the loop. Fig. 5 is a cross section showing the stand and concave end of the lever, and Fig. 6 is an elevation showing the stationary part of the indicator, the movable curtain being shown in dotted lines.

The scoop beam $a$ is of a well-known construction and is provided with poises $l\ l$. Upon the lower arm of the scale beam $a$ is the pivot $n$ which supports a loop $c$, having a knife edge bearing $f$. The beam $a$ has the pivot $m$ resting in the forked stand $b$, having an additional bearing $e$ for a pivot on the lever $d$. This lever $d$ has a hardened bearing which engages on the knife edge $f$. The lever $g$ rocks on a pin $i$ passing through the stand $b$, and the object of said lever $g$ is to lift the lever $d$ from its bearing on the knife edge $f$, this being done by depressing the latch $h$ which is pivoted on the lever $g$, and has a hook $k$ on its lower end which engages in its depressed position the staple $o$, thus holding down the long arm of the lever $g$ and holding up the lever $d$, until such catch is released. The lever $d$ may be adjusted to allow for any variation in weight of the scoop by moving the balance weight $j$ and securing the same by the check nut $r$, or in any other suitable manner. The end of the lever $g$ and sides of the loop $c$ as well as the bearing $f$ may be made concave, flaring or in any other form to give freedom and keep the lever $d$ central.

I have provided an indicating mechanism whereby the operator may see at once whether the scoop is or is not to be applied to the scale. This indicating mechanism comprises a stationary upright part $q$ upon which is printed the words "Off" and "On." Upon the end of the lever $g$ is a curtain $p$ having a perforation which, in the movement of the lever $g$ up and down, brings the words "Off" and "On" alternately behind the perforation in a manner easily understood.

I show my invention as applied at the rear end of a beam, but it will be understood that it may be applied at the front or on other parts of the working mechanism. It may be of various forms suited to convenience and position and the mode of connection between the stationary and moving parts of the scale may be reversed. The necessary weight may be wholly or partially supported by the stationary parts of the scale and be wholly or partially deposited upon the working mechanism and correspondingly removed according to the nature of the arrangement and in a manner not requiring full disconnection from the scale. If the construction in any case necessitates the placing of a poise or balance weight $j$ on the lever $d$ between the point of bearing $f$ and the fulcrum $s$, the lever $d$ may be produced and the extension used as a lever instead of employing the lever $g$. The lever $d$ may be used as a weight and regulator to "draw" any desired amount as five pounds.

I am aware that scales have been made in which a pivoted weight or latch may be turned so as to balance the scale with the "scoop on" or "scoop off," but differing from my invention in this respect, that the whole weight or latch is pivoted to the beam and inseparable therefrom, where by my arrangement the necessary weight is transferred at pleasure from the stationary parts of the scale to the working mechanism and the reverse.

Having thus described my invention, what I claim, and desire to secure by Letters Patent, is—

1. The herein described scoop balance for scales comprising a weighted part normally supported by the working mechanism of the scale, and a lever pivoted to a stationary part of the scale and adapted when depressed at one end to engage with the weighted part, and means for holding the lever in its depressed position; substantially as described.

2. The herein described scoop balance for scales comprising a lever pivoted to the scale and normally supported by a working part of the scale, a second lever also pivoted to the scale adapted to engage the first lever and raise it from its support, and a catch engaging the second lever whereby the first lever is held in its raised position until the catch is released; substantially as described.

3. A scoop balance for scales comprising a pivoted lever normally supported on the loop $c$ from which the working parts of the scale are hung, a second pivoted lever on a stationary part of the scale and having one end arranged to engage and lift the first lever upon the depression of its other end; substantially as described.

4. In a scale in combination with the loop $c$ from which the working parts of the scale are supported, a lever $d$ having an adjustable weight thereon, said lever being supported on said loop, a scale-beam pivoted upon a suitable standard, a second lever $g$ pivoted on said standard, one arm of which lever is adapted to engage and lift the lever $d$, and means for holding the second lever $g$ in its depressed position; substantially as described.

5. In a scale, the pivoted lever $d$, for balancing the scoop, and a second lever as $g$, one arm of which is adapted to engage the lever $d$, and a swinging latch carried by the other arm adapted to engage a catch on the scale; substantially as described.

6. In a scale, the pivoted lever $d$, for balancing the scoop and a second lever one arm of which engages the lever $d$, means for holding the other arm of said second lever in its depressed position and an indicating mechanism arranged to co-operate with said second lever to give information as to whether the scoop should be used or not; substantially as described.

7. The herein described scoop balance comprising the lever $d$, the adjustable weight thereon, the pivot for said lever, the bearing therefor on the loop, the lever $g$, having its short arm formed with a concave at its end to engage the lever $d$, and a hook and catch adapted to hold the long arm of the lever in its depressed position; substantially as described.

8. In a scale a movable part adapted to balance the scoop normally supported by the working mechanism of the scale, positive means for raising said balance from its support and a catch for holding it in its raised position; substantially as described.

9. A scoop balance for scales comprising a pivoted weighted lever supported on the working part of the scale, a second pivoted lever supported on a stationary part of the scale, with one arm adapted on the depression of the other, to engage the first lever and a catch for holding said other arm of the lever in its depressed position; substantially as described.

10. In combination with the movable part normally supported by the working mechanism of the scale and adapted to balance the scoop a lever for raising said movable part carrying a perforated curtain, and a stationary part behind said curtain provided with indicating characters thereon whereby in the upward or downward movement of the lever said characters show through the perforations in the curtain; substantially as described.

11. In combination with the lever $g$ adapted to engage the scoop balancing lever the swinging latch carried by said lever $g$ and adapted to engage a catch on the scale frame, and an indicating mechanism comprising a movable perforated part carried by the lever, and a stationary part supported on the scale frame; substantially as described.

12. In combination with the scoop balancing device a lever for operating the same, and an indicating mechanism composed of a stationary part and a part movable with the lever adapted to be brought into operation by the movement of said lever; substantially as described.

WILLIAM A. WHEELER.

Witnesses:
EDWARD H. BAZIN,
JAMES COX.